United States Patent [19]
Green

[11] 3,872,293
[45] Mar. 18, 1975

[54] MULTI-DIMENSIONAL FOURIER TRANSFORM OPTICAL PROCESSOR

[75] Inventor: Eugene L. Green, New London, Conn.

[73] Assignee: The United States of America as represented by the Secretary of the Navy, Washington, D.C.

[22] Filed: July 30, 1973

[21] Appl. No.: 384,151

Related U.S. Application Data

[63] Continuation-in-part of Ser. No. 216,030, Jan. 7, 1972, abandoned.

[52] U.S. Cl. .... 235/181, 340/15.5 VD, 350/162 SF
[51] Int. Cl. ........................... G06g 7/19, G06g 9/00
[58] Field of Search .......... 235/181; 350/160, 96 B, 350/161, 162 SF; 340/15.5 VD

[56] References Cited
UNITED STATES PATENTS

| | | | |
|---|---|---|---|
| 3,435,244 | 3/1969 | Burckhardt et al. | 350/162 SF |
| 3,536,376 | 10/1970 | Henning | 235/181 |
| 3,549,800 | 12/1970 | Baker | 350/161 |
| 3,633,035 | 1/1972 | Uchida et al. | 350/96 B |
| 3,697,149 | 10/1972 | Van Heeckeren et al. | 350/162 SF |

*Primary Examiner*—Felix D. Gruber
*Attorney, Agent, or Firm*—Richard S. Sciascia; Arthur A. McGill; Prithvi C. Lall

[57] ABSTRACT

A coherent beam of light is modulated by signals from an array of hydrophones. Multi-dimensional optical Fourier transform processing is accomplished in a sequence that includes optical Fourier transform and re-mapping operations that conserve phase and amplitude. In such optical processing of signals from the array the first or temporal Fourier plane of multichannel frequency analysis is scanned to perform a sequence of one or two-dimensional spatial transforms. The spatial transforms, each of which corresponds to a discrete acoustic frequency, are performed after re-mapping the frequency analyzed data into an optical space model of the acoustic array. The means for re-mapping the data is a set of dielectric wave guides. Alternatively, optical signals are physically measured and then re-mapped.

14 Claims, 9 Drawing Figures

MULTI-DIMENSIONAL FOURIER TRANSFORM OPTICAL PROCESSOR

STATEMENT OF GOVERNMENT INTEREST

The invention described herein may be manufactured and used by or for the Govenment of the United States of America for governmental purposes without the payment of any royalties thereon or therefor.

This application is a Continuation-in-Part of my application, Ser. No. 216,030, Filed Jan. 7, 1972, now abandoned.

BACKGROUND OF THE INVENTION

Two-dimensional Fourier transforms or a number of simultaneous one-dimensional transforms can be performed in accordance with concepts described by Cutrona in U.S. Pat. No. 3,519,331 of July 7, 1970 for two-dimensional optical data processors and in an article by Cutrona et al, "Optical Data Processing and Filtering Systems," in IREE Transactions on Information Theory of June 1960. Optical implementation of multichannel temporal Fourier transforms wherein frequency analysis is accomplished simultaneously on many channels, will, of course, provide higher computation speeds than alternative techniques and will also afford economies of size, weight, and equipment and computation cost. Processors heretofore used, however, have not been able to provide Fourier transforms optically in three or more dimensions in the manner taught by this disclosure.

SUMMARY OF THE INVENTION

To preform multi-dimensional Fourier transform processing on signals from a planar hydrophone array, a coherent beam of light is modulated by the hydrophone signals. Analog recording of the input signals on parallel tracks can be provided on a medium such as a photographic film. To perform multichannel frequency anaylsis, the recording is passed through a beam of coherent light and the first optical integration is performed as described in U.S. Pat. No. 3,519,331 of July 7, 1970 issued to Cutrona et al., for a two-dimensional optical data processor. Alternatively, the input function to the processor is generated by scanning the direction of a collimated beam of light that is modulated by the input acoustic signal so that direction cosines of the light beam in a reference plane represent arguments of the input function. Integration to obtain components of the complex Fourier transform is preformed by means of a reference light beam and a storage medium or device in the output plane. The discrete input signals are not stored.

The signals communicated to the temporal Fourier plane consequent to the first stage of processing are re-mapped coherently, i.e., they are re-mapped, preserving relative phases and amplitudes, into an optical space model of the acoustic array. If the array is a planar array, then the elements of the optical model also lie in a plane. The configuration of the optical array is similar geometrically to the configuration of the acoustic array, so that distances between elements of the optical array are proportional linearly to distances between elements of the acoustic planar array. Single mode dielectric wave guide optical fibers can be employed to effect coherent re-mapping, i.e., re-mapping with preservation of phase and amplitude from one stage of the processor to the next without explicit detection of a signal. Alternatively, re-mapping can be performed after a detection operation in which phase is measured with respect to an optical reference. In the sequence of operations required for array signal processing, the first or temporal Fourier plane of multichannel frequency analysis is scanned to perform a sequence of one or two-dimensional spatial transforms. The spatial transforms for discrete acoustic frequencies are performed after re-mapping frequency analyzed data into an optical space model of the acoustic array.

This coherent re-mapping, i.e., re-mapping with preservation of optical phase and amplitude of the output plane of one stage of optical processing into the input plane of the next stage, can be employed, or course, to interface optical processors generally. Fourier transform operations are but a typical application of the technique.

STATEMENT OF THE OBJECTS OF THE INVENTION

The principal object of the invention is to provide time and space Fourier transform signal processing for sonar arrays.

Another object is to provide Fourier transform processing that is an improvement over conventional time delay beam forming followed by frequency analysis.

A further object is to provide multi-dimensional Fourier transform processing by coherently re-mapping, and thereby preserving phase and amplitude, from the output of one stage of processing to the input of a second stage.

Other objects, advantages and novel features of the invention will become apparent from the following detailed description of the invention when considered in conjunction with the accompanying drawings, wherein

OPERATIONS PERFORMED BY A TIME-SPACE OPTICAL FOURIER PROCESSOR

Figure 1:
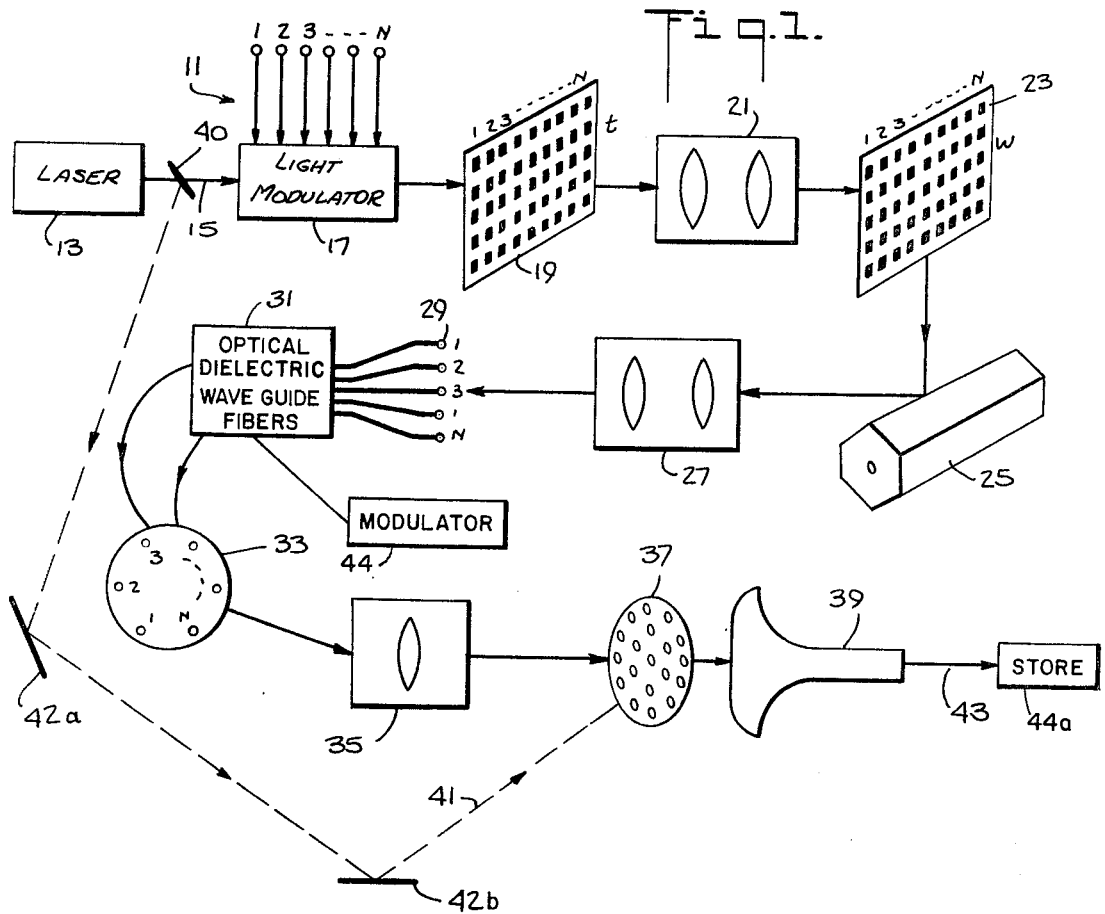
FIG. 1 is a schematic representation of a multi-dimensional Fourier transform optical processor for sonar arrays, showing a preferred embodiment of the invention.

The pressure distribution in the vicinity of a hydrophone array is a space and time function, $F(x, y, z, t)$, that may be represented by a sum of plane-wave solutions, $F_{k,l,m,p}(x,y,z,t)$, of the wave equation:

$$(\delta^2/\delta x^2 + \delta^2/\delta y^2 + \delta^2/\delta z^2 - 1/v^2\ \delta^2/\delta t^2)\ F_{k,l,m,p}(x,y,z,t) = 0 \tag{1a}$$

$$F_{k,l,m,p}(x,y,z,t) = X_k(x)Y_l(y)Z_m(z)T_p(t), \tag{1b}$$

subject to the following condition:

$$k^2 + l^2 + m^2 - P^2/v^2 = 0, \tag{2}$$

where $k,l,m$ are the wave-number components with respect to the $x,y,z$, direction, $p$ is the frequency, and $v$ is the velocity of sound.

A Fourier transform processor operates on $h(x,y,z,t)$, a space- and time-limited sample of the function $F(x,y,z,t)$ provided by the array:

$$H(k,l,m,p) = \int\int\int\int h(x,y,z,t)\, e^{j(kx+ly+mz-pt)} dx\, dy\, dz\, dt.$$

(3)

Given the condition of equation (2) relating the three wave-number components and frequency, it is necessary to sample $F(x,y,z,t)$ in only three rather than four dimensions to derive the entire set of plane waves. For example, if the array lies the plane $z = 0$, the function sampled by the array corresponding to $F_{k,l,m,p}(x,y,z,t)$ is $h(x,y,t)$.

A three-dimensional Fourier transform processor yields $$H(k,l,p) = \int\int\int h(x,y,t)e^{j(kx+ly-pt)}dx\, dy\, dt.$$

(4)

If the acoustic field may be represented by a summation of samples at discrete frequencies, then $$H(k, l, p) = \sum_p \Phi(p)\int\int h_p(x, y)e^{j(kx+ly)}dx\,dy,$$

$$= \sum_p \Phi(p)\Omega_p(k, l),$$

(5)

where $h_p(x,y)$ is the function sampled by the array at frequency $p$.

The processor evaluates $H(k,l,p)$ sequentially as a function of frequency and also the quantity $$I(k,l,p) = [\Omega p(k,l)\, \Phi\, (p)]\, [\Omega p(k,l)\, \Phi\, p]^*,$$

(6)

where $I(k,l,p)$ is the acoustic power in the direction in space corresponding to $(k,l)$ at frequency $p$.

In the optical implementation for the planar array which utilizes a continuously moving medium for storage of hydrophone signals and for light modulation, the time integration is performed initially by the cylindrical lens on all the hydrophone signals:

$$h_1(x,y,t), h_2(x,y,t), \ldots, h_n(x_n,y_n,t), \ldots,$$

which are recorded on parallel tracks as light amplitude transmission functions.

Consider the $n$th hydrophone recorded signal $h_n(t)$. At any position, $t$, in the space aperture in which the time function of the optical processor is represented, the instantaneous light signal passing through the recording is $$S_n(\tau + t) = h_n(\tau + t)\, e^{-\omega_o \tau},$$

(7)

where $\omega_o$ is the frequency of the coherent light. As time advances, the recording moves at constant speed through the aperture from $\tau = +T/2$ at the entrance end of the aperture to $\tau = -T/2$ at the exit end of the aperture.

Let $$\Phi_n(p) = \frac{1}{T}\int_{-\frac{T}{2}}^{\frac{T}{2}} h_n(\tau+t)e^{-j(\omega_o+p\tau)}d\tau.$$

(8)

The integral on the right has the form of a truncated Fourier transform of $S_n(\tau + t)$.

If $$h_n(t) = m_n \cos(\omega_a t + \phi_n),$$

(9)

where $\omega_a$ is a discrete acoustic frequency, $\phi_n$ is the phase corresponding to the $n$th hydrophone and the frequency $\omega_a$, and $m_n$ is the amplitude corresponding to the $n$th hydrophone and frequency $\omega_a$, then $$\Phi_n(p) = m_n e^{-j[(\omega_o+\omega_a)t+\phi_n]} \,\text{sinc}\, \frac{(p+\omega_a)T}{2\pi}$$
$$+ m_n e^{-j[(\omega_o-\omega_a)t-\phi_n]} \,\text{sinc}\, \frac{(p-\omega_a)}{2\pi} T$$

(10)

The first term of equation (10) peaks at $p = -\omega_a$, the second term, at $p = \omega_a$.

In the optical processor, the recording medium moves at a speed of $v'$ cm/sec. The length of the aperture correspsonding to time is, therefore, $$T = v'T \text{ cm}$$

(11)

The spatial frequency, which corresponds to the acoustic frequency, $\omega_a$, is $$\omega_a' = \omega_a \text{ radians}/v' \text{ cm},$$

(12)

$$p' = p \text{ radians}/v' \text{ cm}.$$

(13)

In the optical processor, each recorded spatial frequency yields two diffracted plane waves, i.e., two signals in the temporal Fourier plane given by values $2\pi/\lambda_o\, \rho$ and $-2\pi/\lambda_o\, \rho$ for $p'$, where $\lambda_o$ is the wavelength of light, and $\rho$ and $-\rho$ are the direction cosines of diffracted light. Measured in the temporal Fourier plane, the value $p'$ is $$p' = \pm 2\pi/\lambda f\, r,$$

(15)

where $r$ is the linear distance from the optic axis of the point corresponding to $p'$ or $-p'$ and $f$ is the focal length of the lens. The signal in the temporal Fourier plane at $\pm r$ from the optic axis consists of the optical carrier $e^{-j\omega_o t}$ that is modulated by the acoustic function $$m_n e^{j\omega_a\, t+\phi_n}\, \text{at} + r$$
$$m_n e^{-j\omega_a\, t+\phi_o}\, \text{at} - r.$$

The frequency of the light is decreased by $\omega_a$ at $+r$ and increased by $\omega_a$ at $-r$.

The signals in the temporal Fourier plane are remapped with preservation of relative phase and amplitude, into an optical space model of the array. Let $\alpha$ be the ratio of the linear dimensions of the optical array model to the acoustic array model. Usually, the optical array will be smaller than the acoustic array:

$$x_o/x = y_o/y = \alpha < 1 \tag{16}$$

Let $\beta$ be the ratio of the optical wavelength to the acoustic wavelength, usually much less than one:

$$\lambda_o/\lambda_a = \beta << 1 \tag{17}$$

In most cases, the size of the optical model referred to the wavelength of light is much larger than that of the acoustic array referred to the wavelength of sound:

$$(x_o/\lambda_o)/(x/\lambda_a) = \alpha/\beta = \gamma >> 1 \tag{18}$$

If $k_o = k/\alpha$ and $l_o = l/\alpha$, subject to the condition $k_o^2 + l_o^2 + m_o^2 - \omega_o^2/c^2 = 0$ (where $c$ is the velocity of light), then the processor performs the operation $$\Omega_p(k,l) = \iint h(x,y) e^{j(kx+ly)} dx dy = 1/\alpha^2 \iint h(x_o, y_o) e^{j(k_o x_o + l_o y_o)} dx_o dy_o \tag{19}$$

If $f$ is the focal length of the spherical lens operating on $h(x_o, y_o)$ and $r$ and $s$ are linear distances from center (optical axis) in the spatial Fourier plane, then $$r = k_o \lambda_o/2\pi f = k/\alpha(\lambda_o/2\pi f) ,$$
$$s = l/\alpha(\lambda_o/2\pi f). \tag{20}$$

Coordinates in the optical Fourier plane are linearly proportional to the corresponding acoustic wave numbers.

If $\epsilon_x$ and $\epsilon_y$ are direction cosines with respect to $x$ and $y$ measured in acoustic space, then $$r = \epsilon_x/\alpha(\lambda_o/2\pi f)(\omega_a/v),$$
$$s = \epsilon_y/\alpha(\lambda_o/2\pi f)(\omega_a/v). \tag{21}$$

That is, the coordinates in the optical Fourier plane that correspond to a given direction in space increase linearly with acoustic frequency.

Re-mapping with preservation of relative phase and amplitude can be performed by means of optical dielectric waveguide fibers without explicit measurement of phases and amplitudes in the temporal Fourier plane. Alternatively, re-mapping can be performed by means of electrical conductors after measurement of phases and amplitudes in the temporal Fourier plane.

The output plane of the optical processor is divided, for the purpose of measurement, into a matrix of elements. In FIG. 1 the output plane contains a two-dimensional space transform of signals that had in a previous stage of the processor been coherently re-mapped from the temporal Fourier plane, the output of the multichannel one-dimensional processor.

The $n$th element of the output matrix occupies a definite position $(r_n, s_n)$ in the output plane. To perform coherent detection, i.e., to measure phase and amplitude as a function of position in the output of the processor, rather than power, superimpose a reference optical beam:

$$A(n,t) = ae^{-j(\omega_o t + \epsilon_n(t))} \tag{22}$$

Referring to equation (10), let $p = \omega_a$. Then:

$$\Phi_n(\omega_a) \approx m_n(\omega_a) e^{-j[(\omega_o + \omega_a)t - \phi_n]} \tag{23}$$

Note that the phase term, $(\omega_a t + \phi_n)$, remains nearly constant over a large number of cycles of the optical carrier. Therefore, it is possible to rewrite equation (23) in the following form:

$$\Phi_n(\omega_a) \approx m_n(\omega_a) e^{-j\omega_o t} e^{-j(\omega_a t_a + \phi_n)} \tag{23a}$$

where $t_a$ implies that a minimum measurable unit of time exists on the order of the reciprocal of acoustic frequency, rather than the reciprocal optical frequency.

Let $$\psi = (\phi_n + A) \text{ and } X_n = \omega_a t_a + \chi_n$$

After square law detection the following output is obtained.

$$\psi_n \psi_n^* = m_n^2 + a_n^2 + 2a_n m_n \cos(\chi_n - \epsilon_n) \tag{24}$$

The first term in equation (24) is the signal power; the second term is the reference power; the third term represents intermodulation of signal and reference.

Let $$\text{Let } \epsilon = \omega' t \text{ where } \omega_a << \omega' << \omega_0 \tag{25}$$

To obtain relative phase between hydrophone channels at frequency $\omega_a$, it is sufficient to measure phase of the resultant time-dependent output signals, $S_n'$ relative to $\omega' t$.

$$S_n' = 2am_n(\omega_a) \cos(\chi_n(\omega_a) - \omega' t) \tag{26}$$

Alternatively, to measure $\chi_n$, it is sufficient to evaluate the output $2am_n \cos(\chi_n(\omega_a) - \epsilon_n)$ for two values of $\epsilon_n$: $\epsilon_n = \epsilon_o$; $\epsilon_n = \pm\pi/2$. In practice these measurements can be made if $m_n^2 << a_n^2$.

It is possible to perform relative phase measurements by either of the above means to a fixed, i.e., non-moving input data set (for example, by stopping the continuous advance of the input medium at a time $t_a$). Following measurements on the output, the next input data set, corresponding e.g., to $t_a + T$, where T is the length of the coherent processing time aperture is fed and processed.

The signal power spectrum, $m_n^2$, is a strongly non-uniform function in the optical processor as described above. It is possible to eliminate the signal power term completely from the output of the optical Fourier processor. In the usual Fourier processor, which utilizes an input recording and light modulaing medium, all input data elements to be operated on coherently by the optical processor are simultaneously present in the input aperture of the processor; an input argument, $\tau$, is represented as a linear displacement. The variable $p$, conjugate to $\tau$, is proportional to the direction cosine of a diffracted plane wave. The direction cosine is evaluated for the angle between the wave normal and the direction of positive $\tau$. It is possible to reverse the roles of displacement and angle in the processor. The input argument, $\tau$, is made proportional to the direction cosine, $\alpha$, of a scanned input plane wave.

$$\tau = 2\pi/\lambda_o\, \alpha \tag{27}$$

$\lambda_o$ is the optical wavelength.

The conjugate variable, $p$, is now a linear displacement in a reference plane. The normal to the reference plane corresponds to $\alpha = 0$. An input function of two variables is possible; the variables are two independent input direction cosines. The operation of a multichannel one-dimensional processor is represented by equation (28), below.

$$\Phi_{n_i}(p) = 1/T\, h_n(\tau_i)\, e^{-jp\,t_i} \cdot e^{-j\omega_o\,t} \tag{28}$$

The operation $e^{-jp\,t_i}$ is performed on the $n$th input function, $h_n(\tau_i)\, e^{-j\omega_o\,t}$ for each $\tau_i$ independently. Since the input function is not stored in the processor, the integral cannot be performed instantaneously. Superimpose a reference, $\alpha = 0$, beam $$A = ae^{-j(\omega_o\,t + \varepsilon)} \tag{28a}$$

Define:

$$H_{n_i}(p) = [T\Phi_{n_i}(p) + A] \cdot [T\Phi_{n_i}(p) + A]^*$$
$$= A^2 + h_n^2(\tau_i) + 2ah_n(\tau_i)\cos(p\tau_i - \varepsilon) \tag{29}$$

This operation is performed for each value ($\tau_i$) of the input argument. The output, stored in the Fourier ($p$) plane is a linear summation, represented by $H_n(p)$.

$$H_n(p) = \frac{1}{T}\sum_i H_{n_i}(p) = \frac{1}{T}\int_{-\frac{T}{2}}^{\frac{T}{2}} A^2 d\tau$$
$$+ \frac{1}{T}\int_{-\frac{T}{2}}^{\frac{T}{2}} h_n^2(\tau) d\tau + \frac{2a}{T}\int_{-\frac{T}{2}}^{\frac{T}{2}} h_n(\tau)\cos(p\tau - \varepsilon) d\tau \tag{30}$$

The first term is the power in the reference beam; the second term is the average power in the input signal, constant as a function of $p$; the third term is proportional to the truncated cosine transform of the input signal. To obtain the sine transform it is necessary to replace $\varepsilon$ by $\varepsilon \pm \pi/2$ in equation (3). The sine and cosine tranforms may be obtained simultaneously or sequentially.

If $p \gg 2\pi/T$, then equation (30) takes the following form:

$$H_n(p) = \text{Constant} + k_n(p)\cos(\chi_n(p) + \varepsilon) \tag{30a}$$

It should be noted that modulation of a beam of light as used in this application is defined as variation of the amplitude and/or phase of the beam of light with a signal and includes the use of a laser in which case modulation can be done directly on the process of generating light. Alternatively, modulation can be external to the light source. However, this distinction is not critical in the present disclosure.

An optical system which may consist of lenses, mirrors, and filters, performs a transform operation between an input surface and an output surface. A transform operation is a set of integrations. If $x,y$ are coordinates in an input surface and $k,l$ are coordinates in an output surface, where $f(x,y)$ and $F(k,l)$ are the respective input and output functions, then the operation performed by the optical system is given by equation (31) which is $$F(k,l) = \iint f(x,y)\, g(x,y,k,l)\, dxdy \tag{31}$$

input surface where $g(x,y,k,l)$ defines the operation performed by the optical system. The integration is performed over the input surface. In the special case of the Fourier transform, $g(x,y,k,l)$ is equal to $$e^{j(kx + ly)} \tag{31a}$$

DESCRIPTION OF PREFERRED EMBODIMENTS

In the optical processor shown in FIG. 1, signals from a tranducer array 11 modulate a light beam from a laser 13, such light beam 15 and said signals being projected into light modulator 17. The transducer array is preferably a planar array, i.e., it is a set of acoustic receivers that lie in a plane. The number of array elements and the geometric arrangement of the elements, selected in accordance with overall sonar system requirements, using forms of light modulation such as those shown in FIGS. 7, 8 and 9. The output of the light modulator 17 takes the form of a two-dimensional matrix of points in space 19, each column representing a transducer (1, 2, 3 . . . . N) and each row an instant of time, $t$. An optical system 21 receives the matrix 19, said optical system comprising cylindrical and spherical lens elements that perform parallel one-dimensional Fourier transforms on the columns to yield as an output a temporal Fourier plane 23. The plane 23 thus contains a matrix of points with columns corresponding to transducers (1, 2, 3. . . . .N) and rows corresponding to frequencies ($\omega$).

The temporal Fourier plane 23 is scanned by scanner 25, which can be a rotating mirror or can take other forms, and the output of scanner 25 is re-imaged by a lens system 27 onto the entrance ends 29 of a set of optical dielectric wave guide fibers 31. Since the entrance ends of the fibers are laid along a line, one of each transducer such fibers sample phase and amplitude for all transducers as each light signal modulated by an acoustic frequency is presented by the scanner 25. The exit ends of the fibers, shown as being on a plane 33, are configured to model the spatial transducer array, so that the optical phase and amplitude differences between fibers will be the same at the exit ends of the fibers as at the entrance ends of the fibers. This latter condition can be achieved either by initial figuring of the fiber bundle assembled as a fixed optical component or by applying compression or tension to the fibers by means of modulator 44. Spherical lens 35 performs a two-dimensional Fourier transform on the output signals from the exit ends of the fibers at plane 33 and there is thus derived in the output plane 37 of such spherical lens 35 the Fourier transform which is imaged on a two-dimensional array of light detectors 39. The light detectors 39 can be discrete elements or can be an electro-optical readout tube such as a vidicon. Either square law detection or phase and amplitude direction can be provided. In the case of phase and amplitude detection, a reference light beam 41 derived from the laser 13 is superimposed on the detector array 37 by means of a semi-reflecting mirror 40 in the path of the light beam 15 and reflectors 42a and 42b. The operation of the reference beam is described below in FIGS. 7, 8 and 9. Signals are scanned out as electrical output 43 into analog or digital storage or into a suitable further stage of processing 44a.

Figure 2:
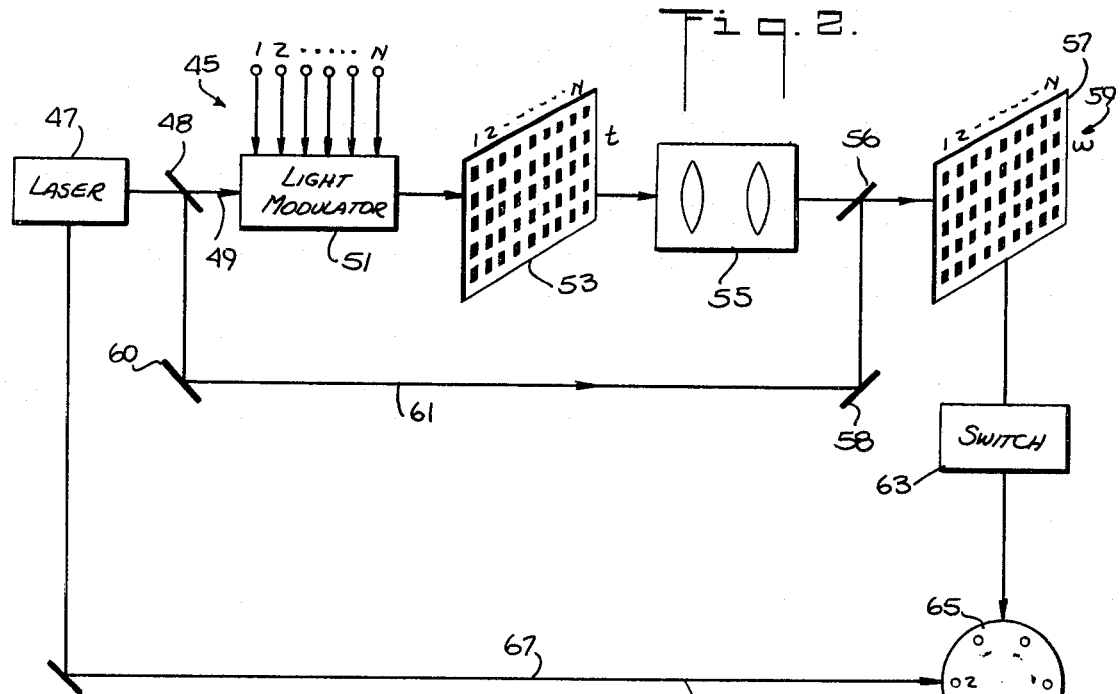

In the embodiment of the invention illustrated in FIG. 2, signals from a transducer array 45 (1, 2....N) and a light beam from laser 47 which travels on path 49, are introduced into light modulator 51. The modulated light beam provides an output in plane 53 wherein the light signals take the form of a two-dimensional matrix of points, each column representing a transducer and each row an instant of time. Such light signals are fed to an optical system 55 consisting of cylindrical and spherical lens elements that perform parallel one-dimensional Fourier transforms on the columns to yield as an output a temporal Fourier plane 57. The plane 57 thus contains a matrix of points with columns corresponding to tranducers and rows correspondong to frequencies. Such temporal Fourier plane coincides in space with a two-dimensional array of light detectors 59. The light detectors 59 can be an array of discrete detectors or an electro-optical readout tube such as a vidicon. A reference light beam 61 is projected to the output plane 57 by a system that includes the semi-transparent mirror 48 in the beam path between the laser 47 and the light modulator 51, a reflecting mirror 60, a second reflecting mirror 58, and a semi-reflecting mirror 56 that is in the beam path between the optical system 55 and the plane 57. By means of such light beam 61 the sigals in the temporal Fourier plane can be detected or detected and integrated over time. The operation of the reference beam is shown further in FIGS. 7, 8 and 9. If the signals from transducer array 45 of FIG. 2 are recorded on a physical medium (such as a photographic film), which modulates a light beam so as to provide light signals in plane 53 in the form of a two-dimensional matrix of points, then operation of the reference beam 61 to measure phase and amplitude in temporal Fourier plane 57 is described by FIG. 7.

Figure 8:
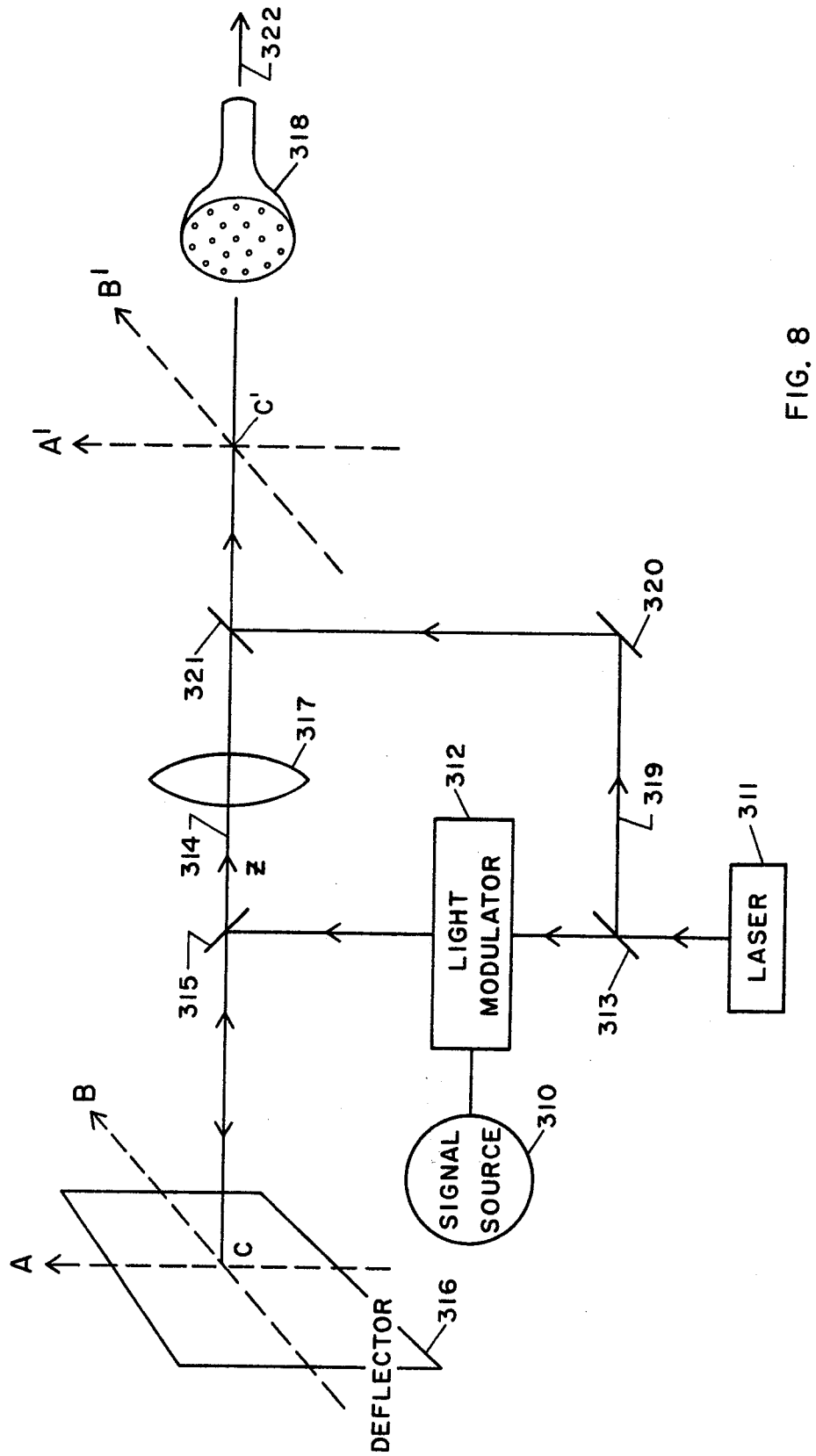
Figure 9:
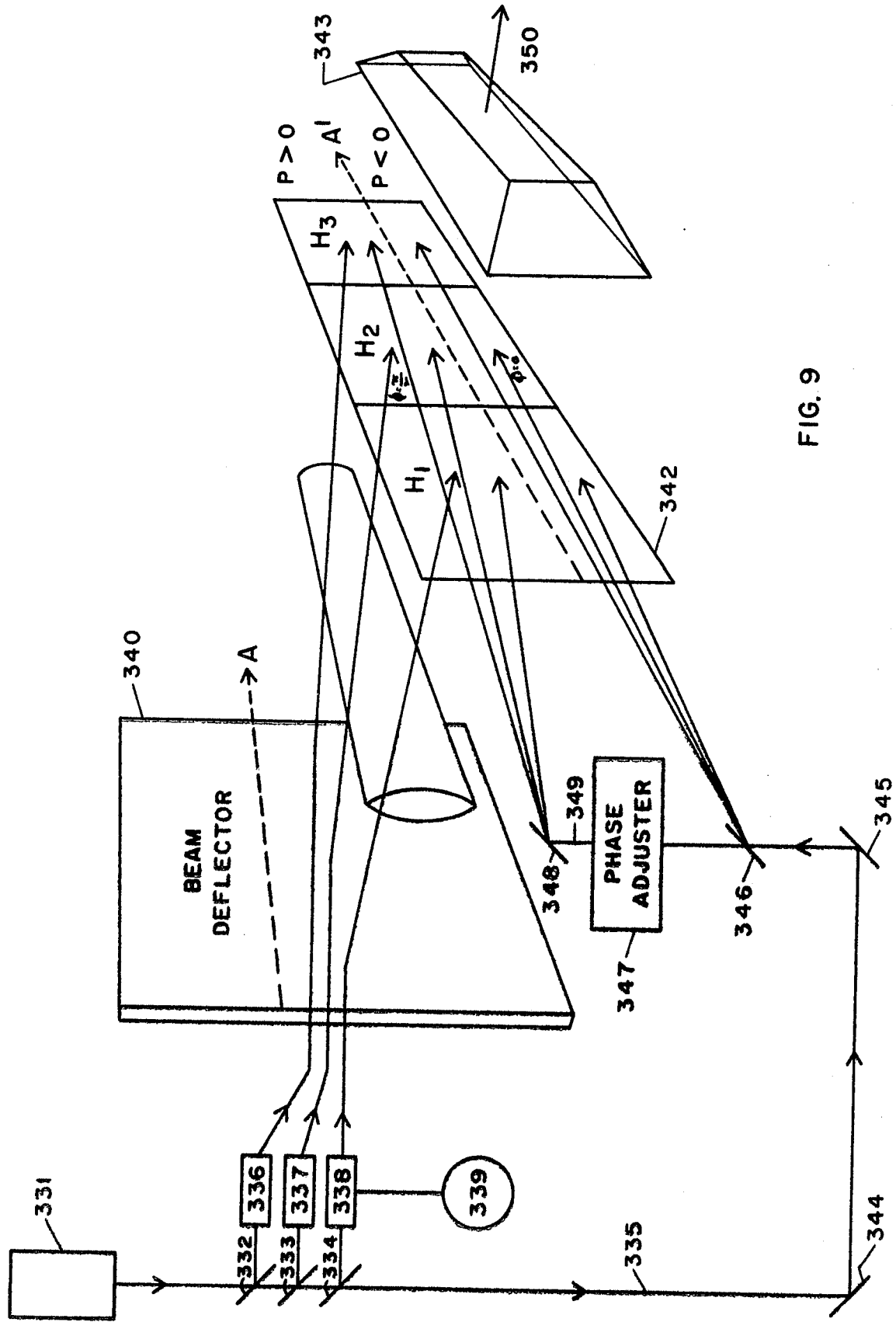

If, alternatively, the signals from transducer array 45 modulate a light beam, which is deflected to provide light signals in plane 53 in the form of the two-dimensional matrix of points, then the operation of the reference beam 61 to measure phase and amplitude is described generally by FIG. 8 and specifically by FIG. 9. In this way phase and amplitude of all signals in the Fourier plane is obtained.

The detected frequency analyzed signals are then scanned or switched synchronously with readout of signals 77 by switch 63 frequency by frequency — that is to say, row by row — onto a set of points that models the transducer array. As each frequency is scanned, the signals are re-mapped onto the array model. Light modulator 65 driven by the re-mapped signal operates at each point in the model on a coherent light beam 67 that is projected from the laser 47 to generate a coherent light model of the array. Such light modulator 65 can be one or more fiber optical dielectric wave guides, or could be P-N junction dielectric wave guides, or could take the form of an electro-optical tube capable of modulating light in accordance with a signal impressed on a scanned electronic beam, or could consist of a light modulator and optical scanner means.

Spherical lens 69 receives the output of light modulator 65 and performs a two-dimensional Fourier transform on the remapped single frequency transducer signals. Lens 69 directs such transform to the output plane 71 and thence to a two-dimensional array of detectors 73. The detectors 73 can be an array of discrete detectors or an electro-optical readout tube such as a vidicon. Either square law detection or phase and amplitude detection by means of a reference beam 75 projected from the coherent light beam 67 (derived from the laser 47) can be utilized. The signals are scanned out as electrical signals 77 into storage or into a further stage of processing.

Figure 3:
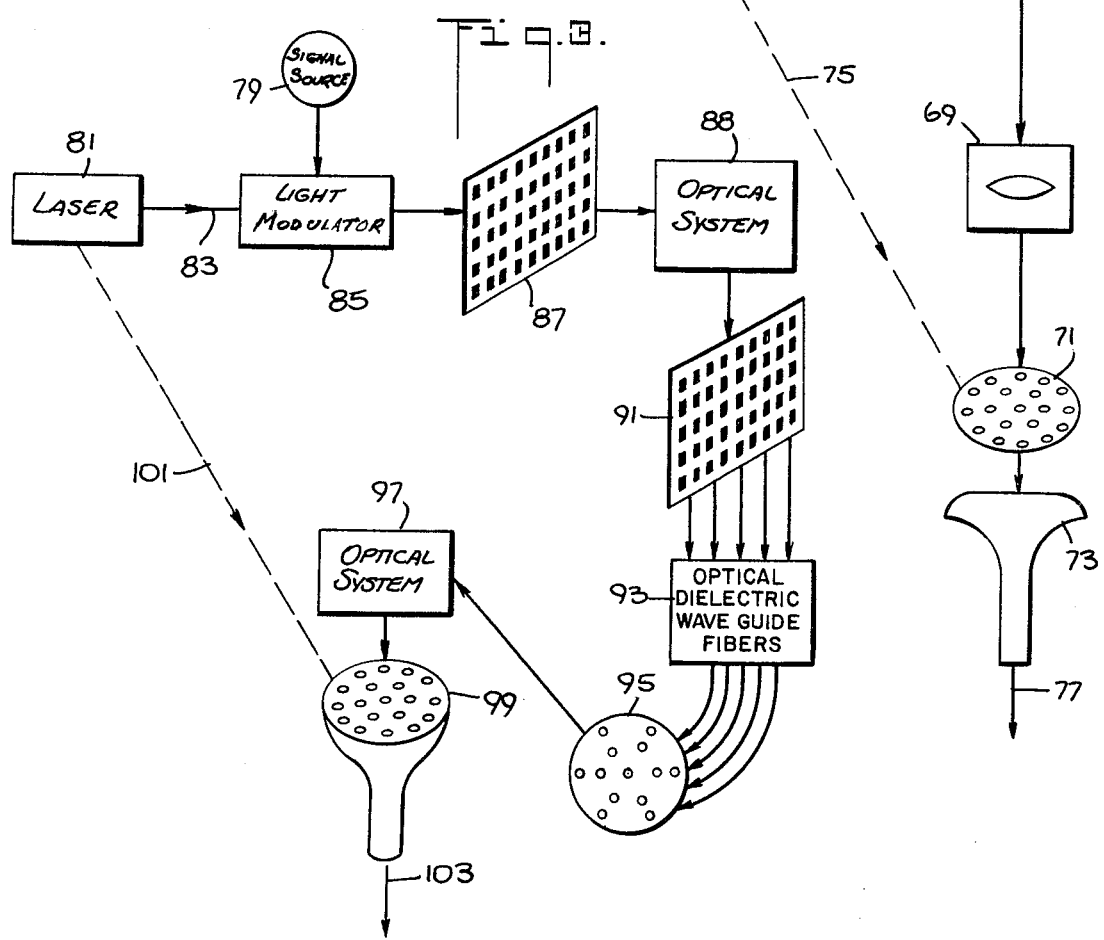

In the embodiment of the invention shown in FIG. 3, a time sequence of signals is provided by source 79 which may be any source of signals. Laser 81 delivers a light beam 83 to a light modulator 85, thereby providing a modulated output of light signals that takes the form of a two-dimensional matrix of points 87. The matrix 87 is the input to an optical system 88 that performs a two-dimensional operation on such light signals to yield a matrix of points in an output plane 91, said output matrix constituting a set of integration or a transform over the input matrix. The signals in the output plane 91 are then picked up by a set of optical fiber dielectric wave guides 93 whose exit end 95 can be rearranged in space to provide the re-mapped input of a second stage of optical processing in optical system 97. The output of the processor is then detected on a two-dimensional array of light detectors 99 which can be an array of discrete detectors or an electro-optical readout tube such as a vidicon. Square law detection can be provided, or phase and amplitude detection can be afforded by superposition of a reference beam 101 derived from the laser 81. Finally, the signals are scanned out as electrical signals 103.

Figure 4:
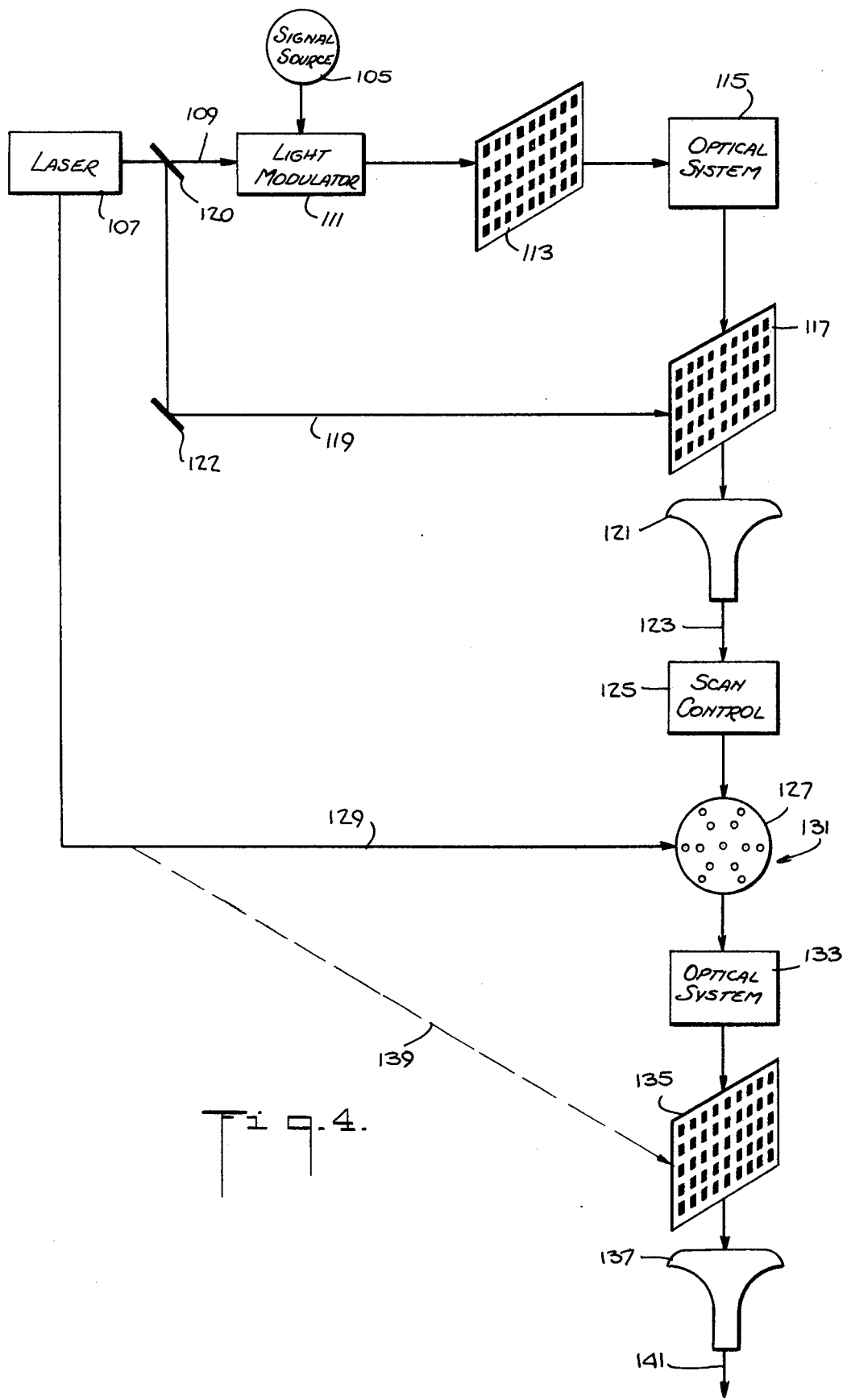

In the embodiment of the invention shown in FIG. 4, a time sequence of signals from source 105 and a light beam from the laser 107, beam 109, are fed to light modulator 111. The output of the light modulator 111 is a grid of light signals taking the form of a two-dimensional matrix of points 113. Optical system 115 performs a two-dimensional operation on the light signals from matrix 113 to yield a matrix of points in an output plane 117, said output matrix constituting a set of integrations over the input matrix. The signals in the output plane are detected coherently on a matrix of light detecting elements 121, which can be an array of discrete elements or an electro-optical readout tube, by means of a superimposed reference beam of light 119 projected from the laser 107 by way of a semi-transparent mirror 120 in the beam path between the laser 107 and the light modulator 111 and a reflecting mirror 122 which directs the reference beam 119 to the output plane 117. The detected signals 123 are scanned and switched by means of scan control 125 onto a set of points that constitute a re-mapping of the points in the original output plane. The re-mapped set of signals 127 drives a light modulator 131 which modulates the light beam 129 derived from laser 107. An optical system 133 performs a second two-dimensional operation on the light signals to yield a further integrated matrix of points in an output plane 135. The output plane 135 coincides with a two-dimensional matrix light detector 137 which can be an array of discrete detectors or an electro-optical readout tube such as a vidicon. Square law detection can be provided. Alternatively, phase and amplitude detection is afforded by means of a reference light beam 139 that is derived from the laser and is superimposed on the detector array with the signal beam. The signals can then be scanned out as electrical signals 141.

Figure 5:
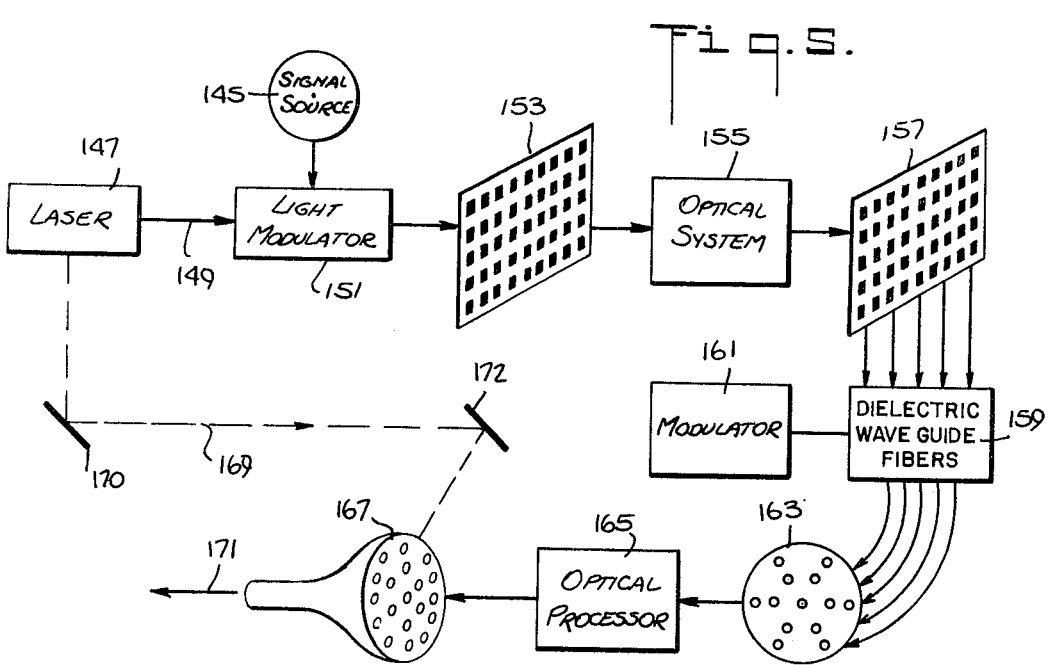
FIGS. 2, 3, 4, 5, and 6 are schematic representations of alternative multi-dimensional Fourier transform optical processors for sonar arrays.

As shown in FIG. 5, a time sequence of signals from a signal source 145 modulates the light beam output from laser 147, said signal source being transmitted to light modulator 151 and the light beam 149 from said laser being transmitted to said light modulator 151. A two-dimensional matrix of points 153 is the output of the light modulator 151 and an optical system 155 receives that matrix and performs a two-dimensional operation on the light signals to yield a matrix of points in an output plane 157, said matrix constituting a set of integrations over the input matrix. The signals in the output plane are picked up by a set of dielectric wave guides 159, which operates to modulate in an arbitrary way the phase and/or the amplitude of the signals by means of modulator 161. This is accomplished by having the modulator 161 apply compression or tension on the fibers of the dielectric wave guide 159. The exit ends 163 of the dielectric wave guide can be rearranged in space to provide the input of a second stage of optical processing, the optical processor 165. The output of the optical processor 165 is detected on a two-dimensional array of detectors 167. Square law detection can be provided; alternatively, phase and amplitude detection can be achieved by superposition of a reference beam 169 derived from the laser 147 and delivered to the array of detectors 167 by means of reflecting mirrors 170 and 172. The signals are scanned out as electrical signals 171.

Figure 6:
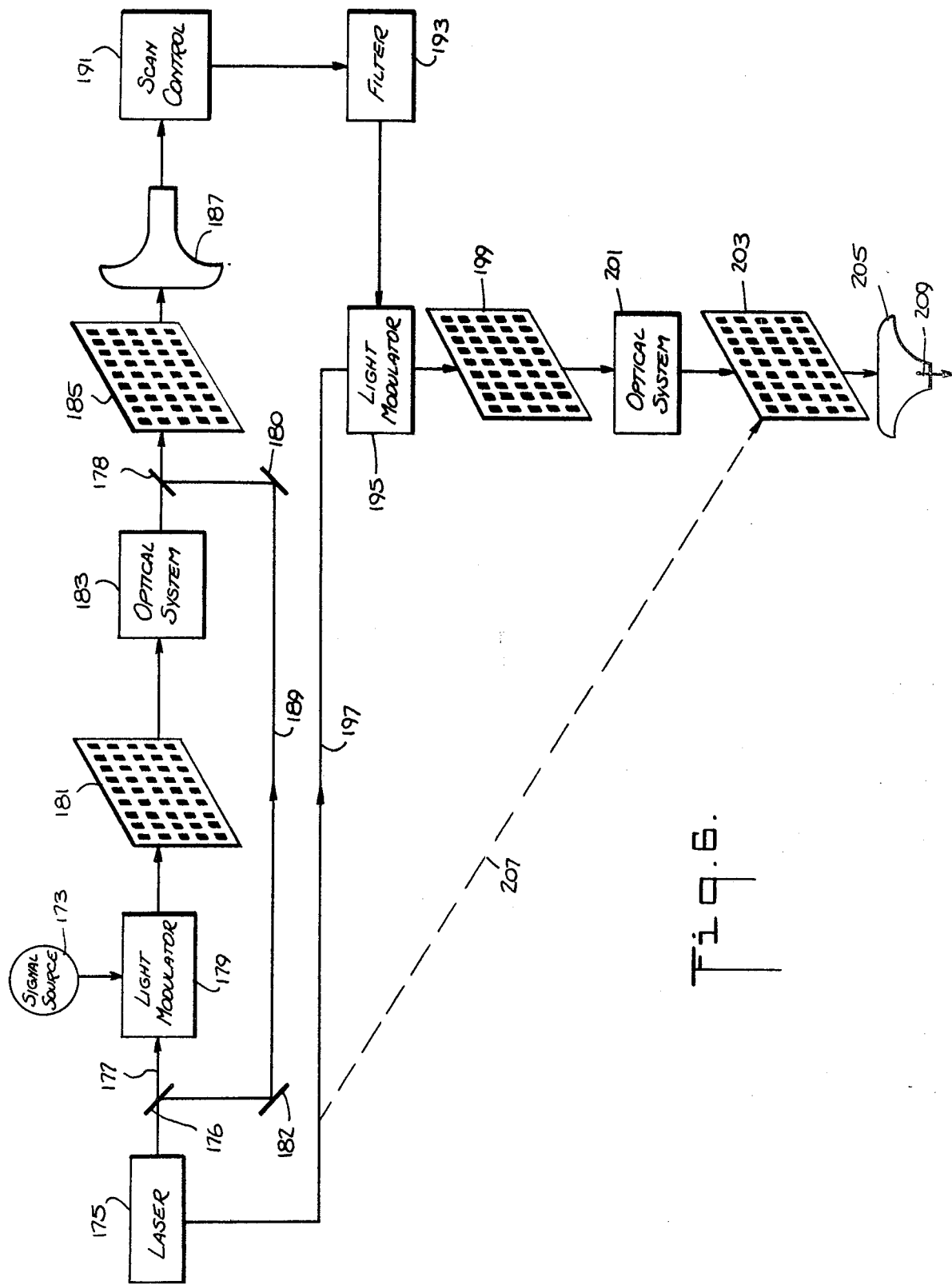

Still another embodiment of the invention is shown in FIG. 6, in which a time sequence of signals is derived from a signal source 173. Laser 175 delivers a light beam 177 to light modulator 179, which also receives the signals from the source 173 to provide a modulated output of the light signals in the form of a two-dimensional matrix of points 181. A two-dimensional operation is performed on the light signals 181 by an optical system 183 to yield a matrix of points in an output plane 185, said matrix constituting a set of integration over the input matrix. The signals in the output plane 185 are detected coherently on a matrix of light detecting elements 187, which can be an array of discrete elements or an electro-optical readout tube, such detection being accomplished by means of a superimposed reference beam of light from the laser; a semi-reflecting mirror 176 in the beam path 177 between the laser 175 and the light modulator 179 delivers the beam 189 to the output plane 185 via a semi-reflecting mirror 178, in the beam path between the optical system 183 and said output plane 185, by way of reflecting mirrors 182 and 180. The detected signals at the light detecting element 187 are switched by means of a scan control 191 through filter 193 to drive a light modulator 195, the filter 193 operating to modulate the amplitude and phase of the signals in accordance with a predetermined program. The light modulator 195 modulate a coherent light beam 197 that is derived from the laser 175 to yield a matrix of points in the output plane 199. Optical system 201 performs a second two-dimensional operation on the output of the light modulator 195 to yield a further re-classified matrix of points in the output plane 203. A two-dimensional matrix of light detectors 205, which can be discrete or can be an electro-optical readout tube, receives such signal. Either square law detection or phase and amplitude detection can be provided. In the case of phase and amplitude detection, a reference light beam 207 derived from the laser 175 is superimposed on the detector array with the signal beam. Signals are scanned out as electrical signals 209.

Figure 7:
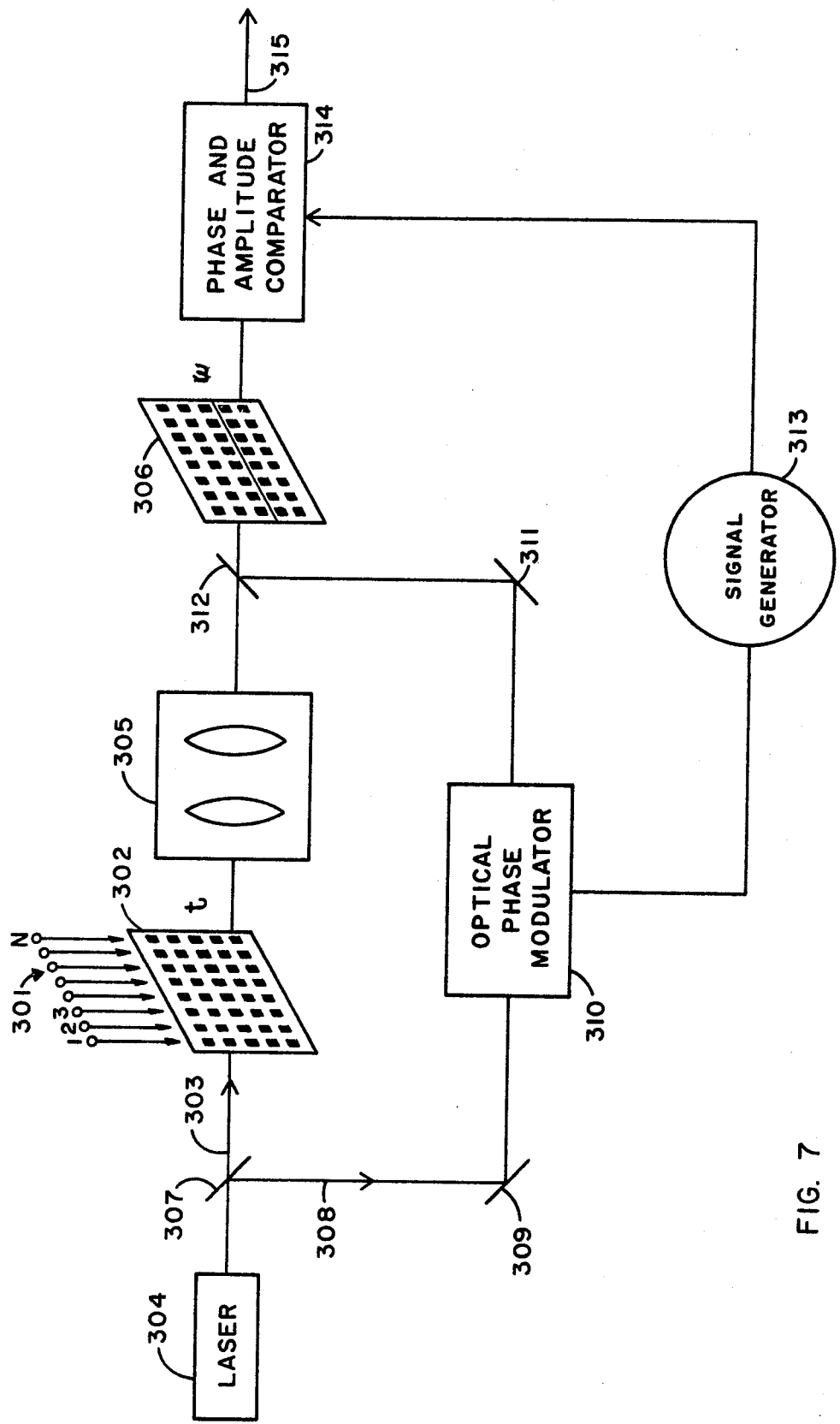
FIGS. 7, 8 and 9 show the operation of elements of FIGS. 1 through 6.

In FIG. 7, real signals from array 301 are recorded on a physical medium 302 that modulates laser beam 303 from laser 304 in the input aperture to the optical processor. Signals are recorded on parallel tracks and a cylindrical lens system 305 performs one-dimensional Fourier transforms on all tracks simultaneously. The Fourier transforms exists in the output plane 306 of the processor, which is coincident with an array of output detectors. Signals can be recorded as continuously advancing signals on a moving film medium, or the signals can constitute a fixed data block that is recorded initially as a time sequence of signals and is then inserted into the processor. Reference beam 308 is projected to the output plane 306 by a system that includes partial reflectors 307 and 312, mirrors 309 and 311 and optical phase modulator 310, which modulates the beam 308 in accordance with equation (23a). Optical phase modulator 310 is driven by signal generator 313, which also supplies an electrical phase reference to phase and amplitude comparator 314. To understand operation of phase modulator 310, it is to be noted that a single frequency signal which is fed as an input continuously on one channel of the optical processor comprised of elements 302 and 305 generates two outputs corresponding respectively to the positive and negative signal frequencies. Each of these output signals is modulated continuously in phase at that frequency in accordance with equation (23a). The modulator 310 therefore can be a continuously moving single frequency grating, a transform lens, and optics that extract a phase modulated light beam and project it over the entire output plane 306 of the processor. The signals detected on the array of light detectors on the output plane are described by equation (26). Either simultaneously or sequentially, electrical signals from the output plane 306 are brought to phase and amplitude comparator 314, where phase and amplitude are measured relative to a signal at the single selected frequency, which was derived from generator 313.

In FIG. 8, a time sequence of signals from source 310 and a light beam from laser 311 are fed to light modulator 313, which effects amplitude and/or phase modulation. Light beam 314, reflected by semi-transparent mirror 315, falls on deflector 316 which may take the form of a rotatable mirror or may take the form of an electro-optical deflector. The reference plane for deflection is the plane ACB on deflector 316. If the deflector is a plane mirror, the mirror surface lies initially in plane ACB. Normally incident light is then reflected back in the direction of the Z-axis. The direction of propagation of this light beam, Z-axis, then has direction cosines $\alpha=0$, $\beta=0$ with respect to A and B. Input matrix of plane wave $(\alpha_i, \beta_i)$ is generated by effecting, in sequence, a corresponding set of mirror rotations from the reference position. The deflected light beam passes again through semi-transparent mirror 315 and is imaged by lens 317 onto Fourier plane A'C'B', which coincides with two-dimensional matrix light detector 318. A reference beam 319 is transmitted by means of semi-transparent mirror 313, mirror 320 and semi-transparent mirror 321 to fall, preferably normally, on plane A'C'B' and the detector array 318. The signals can then be scanned out as electrical signals 322.

FIG. 9 illustrates operation of a multichannel one-dimensional processor based on the principle of FIG. 8. The operation performed by this processor is analogous to that performed by the device shown in FIG. 7, except that an input storage medium is not employed. Light from laser 351 is split into light beams 332, 333, 334, and 335 in the three-channel processor illustrated. It is to be noted that the limitation to three channels is for illustrative purposes only; a larger number is possible. Signals from source 339 and light beams 332, 333 and 334 are fed to light modulators 336, 337, and 338, then pass through beam deflector 340. The plane, which includes axis of rotation A, about which the beams rotate, is imaged on to output plane 342, which is coincident with a matrix of light detectors 343. Reference beam 335 is directed by mirrors 344 and 345 and mirrors 346 normally onto the lower (p<0) part of the output plane with relative phase, $\phi=0$. The reference beam 349, transmitted by mirror 346, passes through phase adjuster 347 and is directed by mirrors 348 normally onto the upper (p<0) part of the output plane with relative phase, $\phi=\pi/2$. In this way both components of the complex Fourier transform of each channel are detected by detector array 343. Signals are scanned out as electrical signals 350.

It should be noted that equation (3), shows that on each of the output channels the detected output consists of a constant independent of location and a function of position $p$. The constant term is filtered out as a D.C. electrical signal in scanning out each channel. The non-constant term is stored, e.g., after analog-to-digital conversion, in a digital memory. To obtain an estimate of the instantaneous power, $m_n^2(p)$, the signals stored at $+p$ and $-p$ are squared and summed. To obtain phase, more precisely tan $(X_n(p) - \epsilon)$, the ratio is calculated of signals stored at $+p$ and $-p$.

Inherent in the systems of multi-channel optical Fourier transform processing that are described in the above systems are a number of salient characteristics. Multi-dimensional optical Fourier transform processing in the sequence of operations defined provides means in which the first Fourier plane is scanned to perform a sequence of additional one or two-dimensional transforms. The first Fourier plane consists of multichannel frequency analyses, and a set of spatial transforms. each of which corresponds to a different frequency, is established after sequentially re-mapping coherently the frequency analyzed data into an optical space model of the acoustic array. In other words, any set of points can be re-mapped arbitrarily for integration by the next stage of processor.

It should be noted further that a set of dielectric wave guide fibers can be employed to re-map coherently, i.e., with preservation of phase and amplitude, an image form in one region of space into an arbitrary set of points in another region of space. Conventional elements, i.e., non-fiber elements, can operate on the new image. The dielectric wave guide fibers also facilitate point by point phase and amplitude modulation of the image.

It is further evident that sequences of optical processing operations, including Fourier transforms in two, three, four, or more dimensions, could be performed by a multistage processor incorporating spherical and cylindrical lenses, dielectric wave guides and appropriate switching devices to facilitate the time multiplexing of optical operations.

It is not essential that dielectric wave guide fibers be employed in coherent re-mapping as a means of executing multidimensional Fourier transforms. A set of dielectric wave guide fibers is equivalent to a set of lenses or optical systems that transfer a set of image points from one plane to another region of space in accordance with a predetermined pattern. Alternatively, it is feasible to perform the multichannel temporal Fourier transform, the first stage of the process, and then physically detect signals in the Fourier plane corresponding to each acoustic frequency by superimposing on the Fourier plane a reference optical carrier. The frequency analyzed signals can then be transferred as electrical signals to a set of light modulators such as dielectric wave guide glass fibers or semi-conductor dielectric wave guides arranged to model the space array. A second light beam would thereby be modulated to perform the spatial transform, and time multiplexing of frequency data would be performed prior to detection of the frequency analyzed signals as described for the fiber model.

The operations and integrations performed by the optical systems are arbitrary. For example, it would be possible to introduce a reference function or functions in an intermediate Fourier plane to obtain an output complex correlation(s) of input with output.

It should be understood that the particular operations defined in FIGS. 7, 8 and 9 are illustrative, intended to expand on and explain the operations shown in FIGS. 1 through 6. By appropriate choice of optical integration means other operations may be performed analogously.

Obviously, many modifications and variations of the present invention are possible in the light of the above teachings. It is therefore to be understood that within the scope of the appended claims the invention may be practiced otherwise than as specifically described.

I claim:

1. A multi-dimensional optical processor for processing a time sequence of data signals from a two-dimensional input comprising:

means for converting said data signals to light signals by modulating the amplitude and phase of a beam of light with said data signals, thus forming a modulated light beam;

first optical means for performing an integral transform on the light signals of said modulated light beam, obtaining an output of said first optical means;

means for re-mapping the output of said first optical means, preserving optical phase and amplitude thereof, thus obtaining re-mapped signals;

second optical means for integral transforming said re-mapped signals, obtaining an output of said second optical means; and means for detecting coherently and storing the output of said second optical means.

2. The optical processor of claim 1 wherein said re-mapping means include dielectric wave guides.

3. The optical processor of claim 1 in which said re-mapping means further comprises a reference beam and a coherent detection means.

4. The optical processor of claim 1 which further comprises an optical scanner means for scanning said modulated light beam, generating an output having each element thereof corresponding to each element of said data signals, and said optical scanner means delivering the output thereof through an optical integral transform means to said means for detecting coherently.

5. The optical processor of claim 1 wherein a laser means provides said beam of light.

6. A multi-dimensional Fourier transform optical processor for processing a time sequence of data from an array of transducers comprising:

means for modulating a beam of light with signals from said transducers;

optical means for performing parallel one-dimensional Fourier transforms on said transducer signals in time domains, yielding as an output a coherent frequency analysis of said transducer signals preserving phase and amplitude thereof, thus forming frequency analyzed signals;

a set of optical dielectric wave guides at least equal in number to the number of transducer channels, said dielectric wave guide fibers conducting said frequency analyzed signals, preserving relative phase and amplitude, re-mapping said signals into a model of said array, thus forming re-mapped frequency analyzed signals;

means for scanning said re-mapped frequency analyzed signals at the output of said optical system, delivering said re-mapped frequency analyzed signals into said dielectric wave guides;

an optical system including means for performing a two-dimensional Fourier transform on said re-mapped frequency analyzed signals forming a sequence of two-dimensional Fourier transforms;

means for detecting and storing said sequence of two-dimensional Fourier transforms and constituting a three-dimensional Fourier transform yielding direction and frequency of signals received by said array.

7. A multi-dimensional Fourier transform optical processor for processing a time sequence of data signals from an array of transducers comprising:

means for modulating a beam of light with said data signals from said array of transducers;

a first optical means for performing parallel one-dimensional Fourier transforms on said data signals in a time domain, thus yielding as an output providing coherent frequency analysis of said data signals preserving phase and amplitude thereof;

means for detecting and integrating over time the output of said first optical means, preserving phase and amplitude information thereof, said detecting and integrating means including a reference optical beam superimposed on the output plane of said first optical means and a one-dimensional matrix of light sensing elements responsive to interaction of the frequency analyzed beam and the reference beam;

means for scanning the frequency analyzed signals over said matrix of light sensing elements and switching synchronously with the output of said scanning means, line by line, said re-mapped frequency analyzed and frequency analyzed signals forming a set of points modeling said array;

means for constructing an optical model for modulating the coherent light re-mapping signal frequency signals obtained by said detecting and integrating means;

second optical means for performing a two-dimensional Fourier transform on such coherently re-mapped signals, and obtaining an output thereof; and means for detecting and storing the output of second optical means.

8. The optical processor of claim 7 wherein said matrix of light sensing elements of said detecting and integrating means is two-dimensional.

9. The optical processor of claim 7 wherein said scanning means is electronic for re-mapping signals into a model of said array by scanning each frequency position to provide an optical model of said array signals at each frequency.

10. A multi-dimensional optical processor for performing a sequence of optical operations on a two-dimensional data input by coherent re-mapping of data points between processing stages with preservation of optical phase and amplitude thereof and dynamic phase and amplitude filtering in conjunction with the coherent re-mapping, said processor comprising:

first modulating means for modulating light signals with such data;

first optical means for performing integral transform on the output of said first modulating means;

means for coherently re-mapping the output of said first optical integral transforming means and filtering coherently the output of said first optical integral transforming means, obtaining an output thereof;

means for detecting the output of said re-mapping and filtering means and for obtaining an output thereof;

second modulating means for modulating light with the output of said detecting means;

second optical means for further integral transforming said signals; and means for detecting and storing the output of said second optical means.

11. The optical processor of claim 10 wherein said coherently re-mapping and filtering means are dielectric wave guides.

12. The optical processor of claim 10 wherein said coherently re-mapping and filtering means include a reference beam and coherent detection means and said filtering means performing directly on the optical signals by a light modulating means before coherent detection thereof.

13. The optical processor of claim 10 wherein said means for coherently re-mapping and filtering the output of said first optical means is electrical.

14. The optical processor of claim 10 wherein said means for filtering the output of said first optical means includes modulating means of the output of said second optical means.

* * * * *